United States Patent
Cao et al.

(10) Patent No.: US 11,845,023 B2
(45) Date of Patent: Dec. 19, 2023

(54) FILTER WITH PASSIVE-ROTATION FILTER FLEMENTS

(71) Applicant: YANSHAN UNIVERSITY, Qinhuangdao (CN)

(72) Inventors: Miaoyan Cao, Qinhuangdao (CN); Shaojie Tian, Qinhuangdao (CN); Han Hu, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 315 days.

(21) Appl. No.: 17/290,714

(22) PCT Filed: Jul. 31, 2020

(86) PCT No.: PCT/CN2020/106249
§ 371 (c)(1),
(2) Date: Apr. 30, 2021

(87) PCT Pub. No.: WO2021/018290
PCT Pub. Date: Feb. 4, 2021

(65) Prior Publication Data
US 2021/0394093 A1 Dec. 23, 2021

(30) Foreign Application Priority Data
Aug. 1, 2019 (CN) .......................... 201910706617.8

(51) Int. Cl.
*B01D 33/42* (2006.01)
*B01D 33/15* (2006.01)

(52) U.S. Cl.
CPC ............. *B01D 33/42* (2013.01); *B01D 33/15* (2013.01)

(58) Field of Classification Search
None
See application file for complete search history.

(56) References Cited

U.S. PATENT DOCUMENTS

| 22,814 A | * | 2/1859 | Martin | F23J 15/022 |
| | | | | 55/DIG. 20 |
| 149,742 A | * | 4/1874 | Gordon | B01D 45/14 |
| | | | | 55/DIG. 20 |

(Continued)

FOREIGN PATENT DOCUMENTS

| CN | 202283444 U | 6/2012 |
| CN | 202289947 U | 7/2012 |

(Continued)

OTHER PUBLICATIONS

CN First Office Action for Application No. CN201910706617.8, dated Mar. 2, 2020, 7 pages.

(Continued)

*Primary Examiner* — Robert J Popovics
(74) *Attorney, Agent, or Firm* — Lowenstein Sandler LLP (57) ABSTRACT

A consumption-free high-efficiency filter includes a tank body provided with a liquid outlet, a filter closure head provided with a liquid inlet and fixedly mounted with the tank body, a first group of support rings and second group of support rings that are respectively fixedly mounted at an upper end of the tank body and a lower end of the tank body, an upper cross support frame and a lower cross support frame, a mandrel, a first sliding bearing and a second sliding bearing used for rotatably mounting an upper end of the mandrel and a lower end of the mandrel, and a set of filter elements. Each filter element includes a filter element sleeve fixedly mounted on the mandrel, a blade and a filter loop.

8 Claims, 7 Drawing Sheets

(56) References Cited

U.S. PATENT DOCUMENTS

| | | | | |
|---|---|---|---|---|
| 519,026 | A * | 5/1894 | Ringheim | B01D 45/14 261/126 |
| 602,868 | A * | 4/1898 | Nilson | B01D 45/14 122/492 |
| 630,024 | A * | 8/1899 | Baker | F22B 37/263 122/491 |
| 814,837 | A * | 3/1906 | Fenton | B01D 46/4272 15/340.1 |
| 969,364 | A * | 9/1910 | Grootenhuis | B01D 33/70 210/354 |
| 1,359,693 | A * | 11/1920 | Gill | F03D 3/065 416/200 R |
| 1,438,553 | A * | 12/1922 | Quam | F02M 35/022 55/DIG. 28 |
| 1,527,355 | A * | 2/1925 | Gentile | F02M 33/02 55/DIG. 28 |
| 1,703,867 | A * | 3/1929 | Bursley | F02M 33/02 123/25 J |
| 2,006,244 | A * | 6/1935 | Kopsa | B01D 45/14 55/403 |
| RE20,672 | E * | 3/1938 | Kopsa | F25B 43/02 62/470 |
| RE20,885 | E * | 10/1938 | Kopsa | B01D 45/14 48/189.5 |
| 2,408,741 | A * | 10/1946 | Dodge | B01D 29/356 210/355 |
| 2,617,273 | A * | 11/1952 | Findlay | B01D 9/004 23/296 |
| 2,954,841 | A * | 10/1960 | Reistle, Jr. | B01D 19/0052 55/416 |
| 3,249,227 | A * | 5/1966 | Long | E21B 21/063 210/512.1 |
| 3,447,290 | A * | 6/1969 | Flory | B01D 45/14 55/432 |
| 3,631,985 | A * | 1/1972 | Taeger | B01D 35/06 210/222 |
| 3,645,699 | A * | 2/1972 | Brodie | B01D 9/0059 62/545 |
| 3,816,981 | A * | 6/1974 | Carnewal | B01D 45/14 55/467 |
| 4,130,389 | A * | 12/1978 | Kaburagi | F23D 14/24 431/183 |
| 4,361,490 | A * | 11/1982 | Saget | B04B 5/12 210/512.3 |
| 4,460,393 | A * | 7/1984 | Saget | B04B 5/12 209/714 |
| 4,478,718 | A * | 10/1984 | Saget | B04B 5/12 209/714 |
| 4,629,481 | A * | 12/1986 | Echols | B04C 3/04 122/34 |
| 6,200,361 | B1 * | 3/2001 | Krymsky | B01D 50/00 55/319 |
| 7,258,713 | B2 * | 8/2007 | Eubank | F02M 35/022 55/401 |
| 7,718,055 | B2 * | 5/2010 | Iou | E04D 13/0409 52/302.1 |
| 7,857,879 | B2 * | 12/2010 | Egger | B01D 45/08 55/423 |
| 8,425,670 | B2 * | 4/2013 | Carlsson | B04B 9/06 95/19 |
| 9,132,370 | B2 * | 9/2015 | Gaebler | B01D 45/08 |
| 9,192,886 | B2 * | 11/2015 | Nieuwoudt | B01D 45/12 |
| 2008/0110140 | A1 * | 5/2008 | Egger | B01D 50/20 55/337 |
| 2014/0007770 | A1 * | 1/2014 | Gaebler | B01D 45/12 95/272 |
| 2014/0013764 | A1 * | 1/2014 | Biagioli | F23C 7/004 60/748 |
| 2021/0394093 | A1 * | 12/2021 | Cao | B01D 33/15 |
| 2022/0001310 | A1 * | 1/2022 | Jellinggaard | B01D 29/17 |

FOREIGN PATENT DOCUMENTS

| | | |
|---|---|---|
| CN | 202526976 U | 11/2012 |
| CN | 110354565 A | 10/2019 |
| DE | 4137496 A1 | 5/1993 |
| JP | 2000248589 A | 9/2000 |

OTHER PUBLICATIONS

International Search Report for PCT Application No. PCT/CN2020/106249, dated Nov. 4, 2020, 2 pages.

* cited by examiner

FILTER WITH PASSIVE-ROTATION FILTER FLEMENTS

RELATED APPLICATIONS

This application claims the benefit of International Application No. PCT/CN2020/106249, filed Jul. 31, 2020, that claims priority to Chinese Application No. CN201910706617.8, filed Aug. 1, 2019. The entire contents of both applications are hereby incorporated by reference.

TECHNICAL FIELD

The present disclosure relates to the technical field of fluid delivery filtration treatment, and in particular to a filter with passive-rotation filter elements.

BACKGROUND

In modern industrial production, there are problems, such as equipment and pipeline scaling, wax precipitation, and corrosion, in pipeline equipment of various industries (such as iron and steel industry, chemical industry, smelting industry, food industry, papermaking industry, and oil delivery). The devices involved in solving these problems may be divided into chemical filtration and physical adsorption according to principles. For example, there are filtration devices which use the materials, such as activated carbon, with large surface areas, and these water treatment devices will have the problem of replacing filter elements after being used for a period of time, so the use cost is high; there are also treatment devices using ionization, these devices are high in power consumption, and electrodes are easily corroded by industrial wastewater.

SUMMARY

The objective of the present disclosure is to provide a filter with passive-rotation filter elements, which designs a low-consumption, environmentally friendly, and high-efficiency liquid delivery filtration treatment device with respect to how to solve the problems, such as scaling, wax precipitation, and corrosion, in relevant industries. The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a filter with passive-rotation filter elements includes a tank body provided with a liquid outlet, and a filter closure head. The filter closure head is provided with a liquid inlet and is fixedly mounted with the tank body. The filter with passive-rotation filter elements further includes a first group of support rings and second group of support rings that are respectively fixedly mounted at an upper end of the tank body and a lower end of the tank body, and an upper cross support frame and a lower cross support frame. The first and second groups of support rings comprise grooves for matching and lapping respective ones of the upper and lower cross support frames. The filter with passive-rotation filter elements further includes a mandrel including an upper end and a lower end, and a first sliding bearing and a second sliding bearing used for rotatably mounting the upper end of the mandrel and the lower end of the mandrel. The first sliding bearing and the second sliding bearing are arranged at central positions of the upper and lower cross support frames. The filter with passive-rotation filter elements further includes a set of filter elements. Each filter element of the set of filter elements includes a filter element sleeve fixedly mounted on the mandrel, a blade and a filter loop. The blade is welded on the filter element sleeve, and a center of the filter loop located below the blade is mounted and fixed to the filter element sleeve.

Further, sliding bearing support rings can be welded at the central positions of the two cross support frames. The two sliding bearings are respectively fixedly mounted on the sliding bearing support rings.

Further, screw threads can be turned in the top end of the mandrel. A snap ring groove is formed in the shaft diameter at the bottom of the mandrel. A hexagonal plane is turned on the end surface of the bottom of the mandrel, so as to facilitate mounting. A snap ring is mounted in the snap ring groove. Two ends of the mandrel are fixedly mounted with shaft head closure heads through screw threads after penetrating through the sliding bearings.

Further, both groups of the support rings can be welded on the tank body through four fan-shaped rings. A hexagonal joint is welded at an end part of each shaft head closure head.

Further, sealing loops can be respectively arranged on the lower side of the upper sliding bearing and the upper side and the lower side of the lower sliding bearing. A sealing gasket is mounted between each shaft head closure head and the upper cross support frame.

Further, there can be four filter elements. The filter element sleeves of the four filter elements are fixedly mounted on the mandrel in sequence from top to bottom. The blades are respectively helically fixed and welded on the filter element sleeves.

Further, the filter loop can include a plurality of loops of concentric annular bodies with different diameters and a peripheral loop. The plurality of loops of concentric annular bodies are welded together through an N-shaped support. The peripheral loop is welded on the outermost loop of the annular bodies. The center of the annular body on the innermost side is matched and fixedly mounted with the filter element sleeve.

Further, the blades, the peripheral rings, the N-shaped supports, and the annular bodies can all be made of an anti-wax anti-scale anti-corrosion alloy material.

BRIEF DESCRIPTION OF THE DRAWINGS

To describe the technical solutions in the embodiments of the present disclosure or in the prior art more clearly, the following briefly describes the accompanying drawings required for describing the embodiments. The accompanying drawings in the following description are merely some embodiments of the present disclosure, and those of ordinary skill in the art may still derive other drawings from these accompanying drawings without creative efforts.

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

In the drawings: 1—filter closure head; 2—tank body; 3—cross support frame; 3U—upper cross support frame; 3L—lower cross support frame; 4—support ring; 5—filter element; 6—mandrel; 7—shaft head closure head; 8—sliding bearing support ring; 9—sliding bearing; 10—snap ring; 11—sealing loop; 12—inlet of the filter; 13—outlet of the filter; 100—filter; 500—filter loop; 501—filter element sleeve; 502—blade; 503—peripheral loop; 504-N—shaped support; 505—annular body.

DETAILED DESCRIPTION

The technical solutions in the embodiments of the present disclosure will be clearly and completely described herein below with reference to the accompanying drawings in the embodiments of the present disclosure. The described embodiments are merely part rather than all of the embodiments of the present disclosure. On the basis of the embodiments of the present disclosure, all other embodiments obtained by those of ordinary skill in the art without creative work fall within the protection scope of the present disclosure.

One objective of the present disclosure is to provide a filter with passive-rotation filter elements, which designs a low-consumption, environmentally friendly, and high-efficiency liquid delivery filtration treatment device with respect to solving problems, such as scaling, wax precipitation, and corrosion, in relevant industries.

To achieve the above objective, the present disclosure provides a filter with passive-rotation filter elements, including a filter closure head, a tank body, two cross support frames, a mandrel, and filter elements. The filter closure head is provided with a liquid inlet and is fixedly mounted with the tank body through flanges. A liquid outlet is formed in the tank body. Two groups of support rings are respectively fixedly mounted at the upper end and the lower end in the tank body. Grooves used for matching and lapping the two cross support frames are formed in both groups of the support rings. Sliding bearings used for rotatably mounting the upper end and the lower end of the mandrel are arranged at the central positions of the two cross support frames. Filter element sleeves of the filter elements are fixedly mounted on the mandrel. The filter element includes blades and a filter loop. The blades are welded on the filter element sleeves. The centers of the filter loops located below the blades are mounted and fixed to the filter element sleeves.

The filter with passive-rotation filter elements can achieve a number of technical effects. For example, in the filter with passive-rotation filter element provided by the present disclosure, filter element blades can be designed by using a design concept of a propeller blade, so that the filter element blades may be rotated passively under the impact of a high-speed fluid and be in full contact with an ionization material, thereby preventing scaling. Filter element parts of the filter with passive-rotation filter elements can be made of the anti-wax anti-scale anti-corrosion alloy material, so that a high-efficiency anti-scaling effect may be achieved.

In order to make the above objective, features, and advantages of the present disclosure become more apparent and more comprehensible, the present disclosure is further described in detail below with reference to the accompanying drawings and specific implementation manners.

Figure 1:
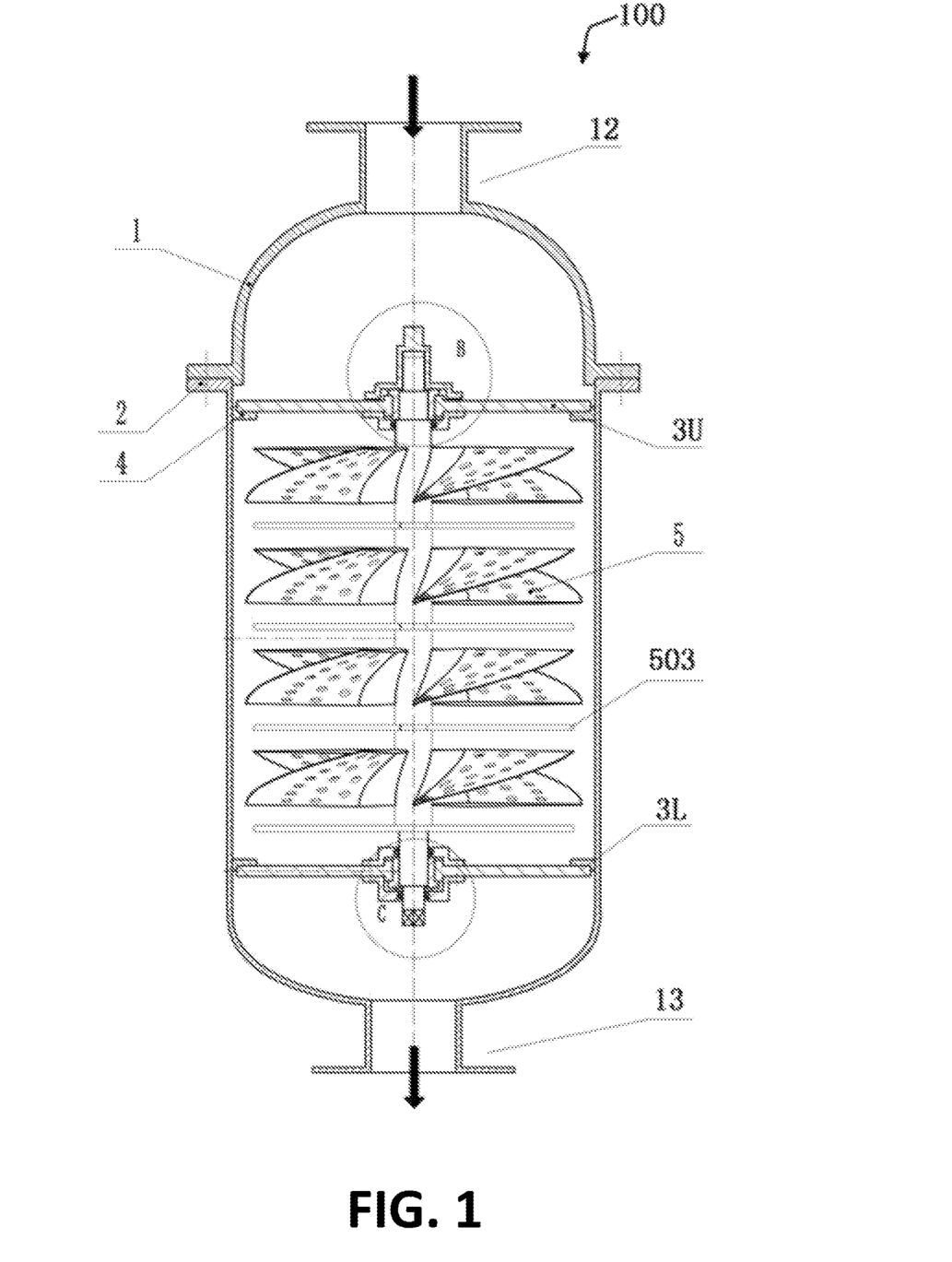
FIG. 1 is a semi-sectional view of a filter along a central symmetry line.
Figure 2:
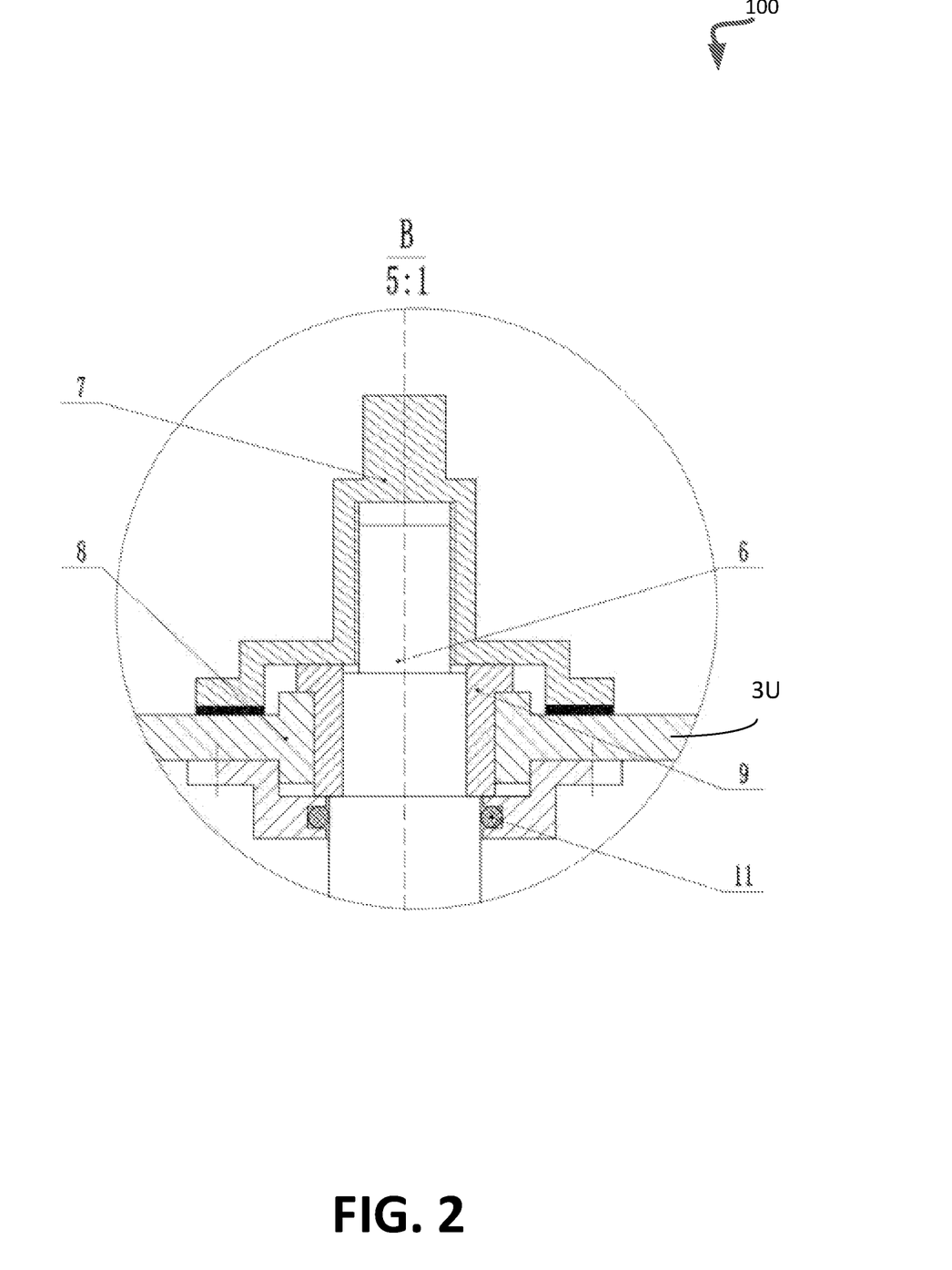
FIG. 2 is a partially enlarged view of position B in FIG. 1.
Figure 3:
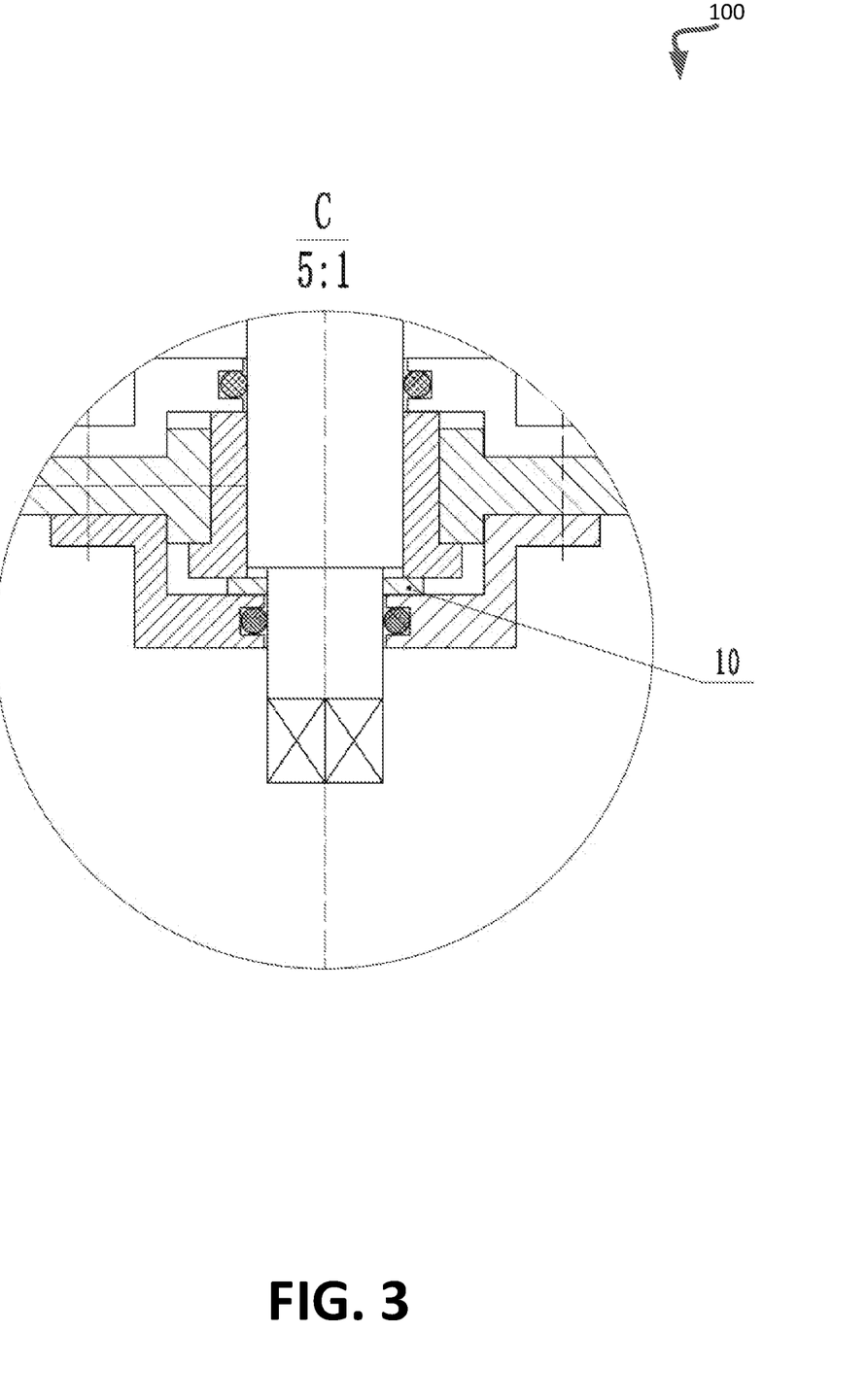
FIG. 3 is a partially enlarged view of position C in FIG. 1.
Figure 4:
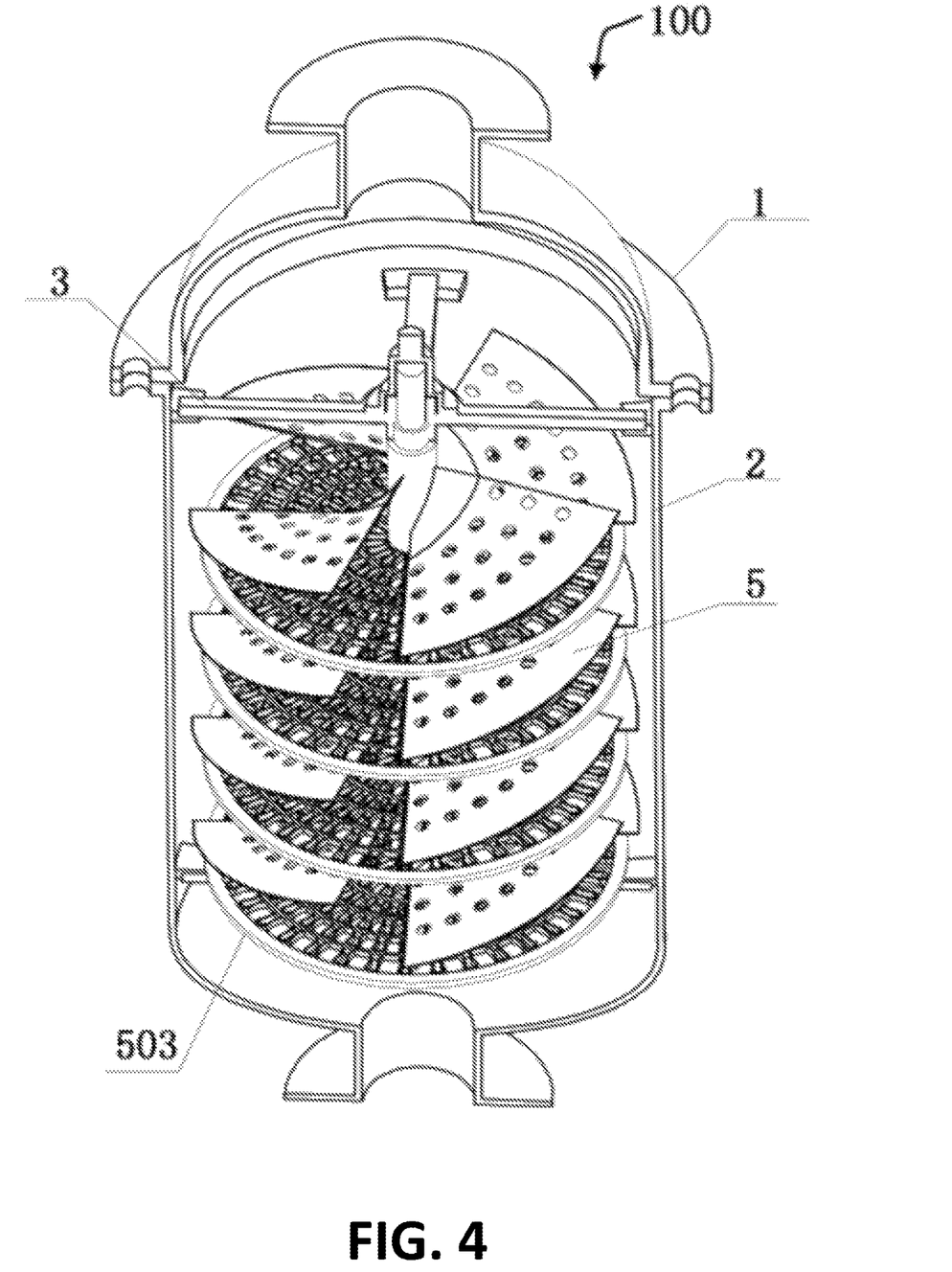
FIG. 4 is a schematic diagram of an internal mounting structure of a tank body of the present disclosure.
Figure 5:
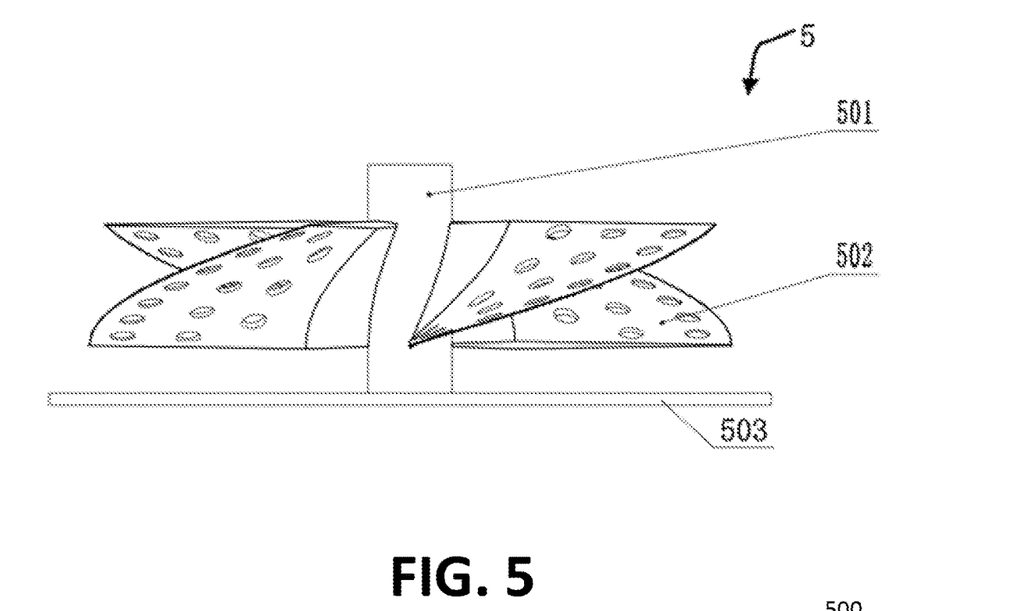
FIG. 5 is a schematic structural diagram of a filter element.
Figure 6:
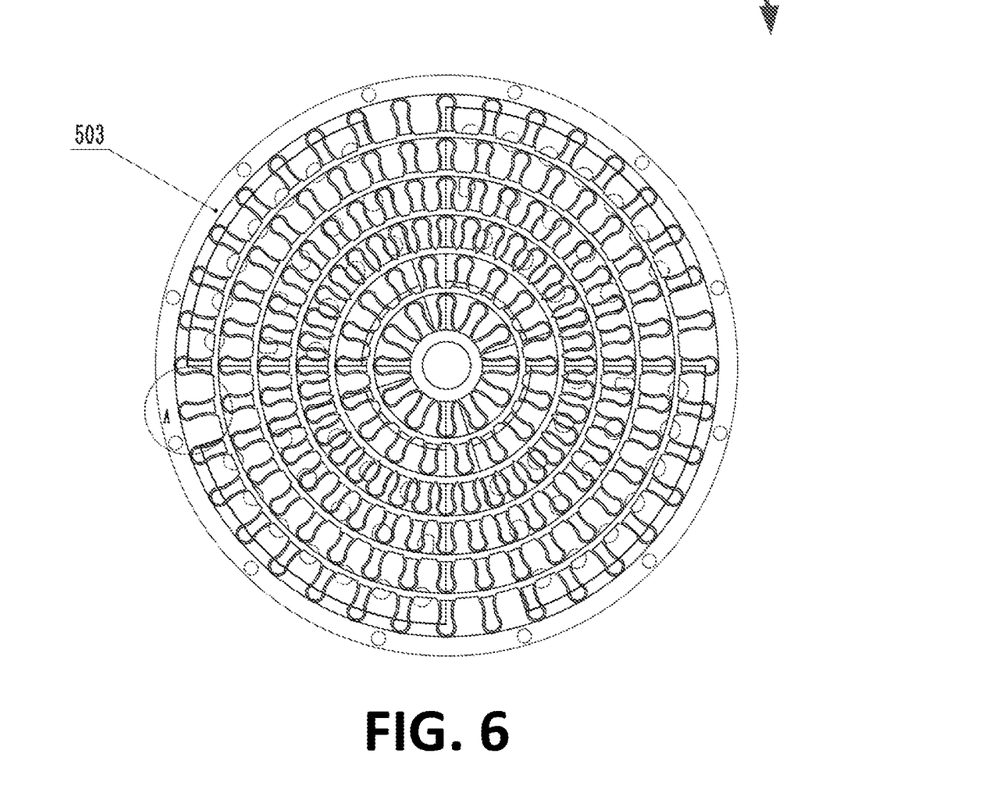
FIG. 6 is a schematic structural diagram of a filter loop.
Figure 7:
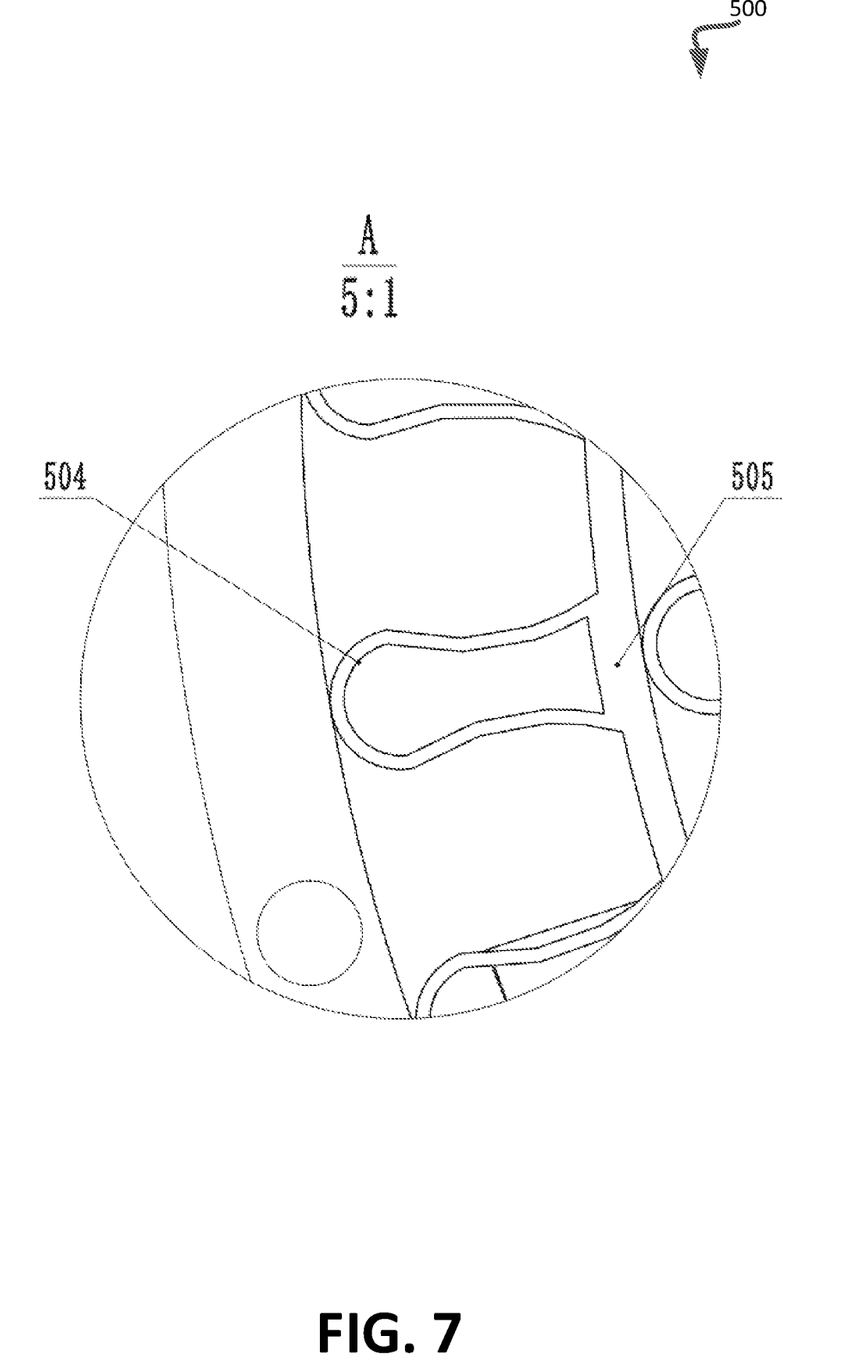
FIG. 7 is a partially enlarged schematic diagram of position A in FIG. 6.
Figure 8:
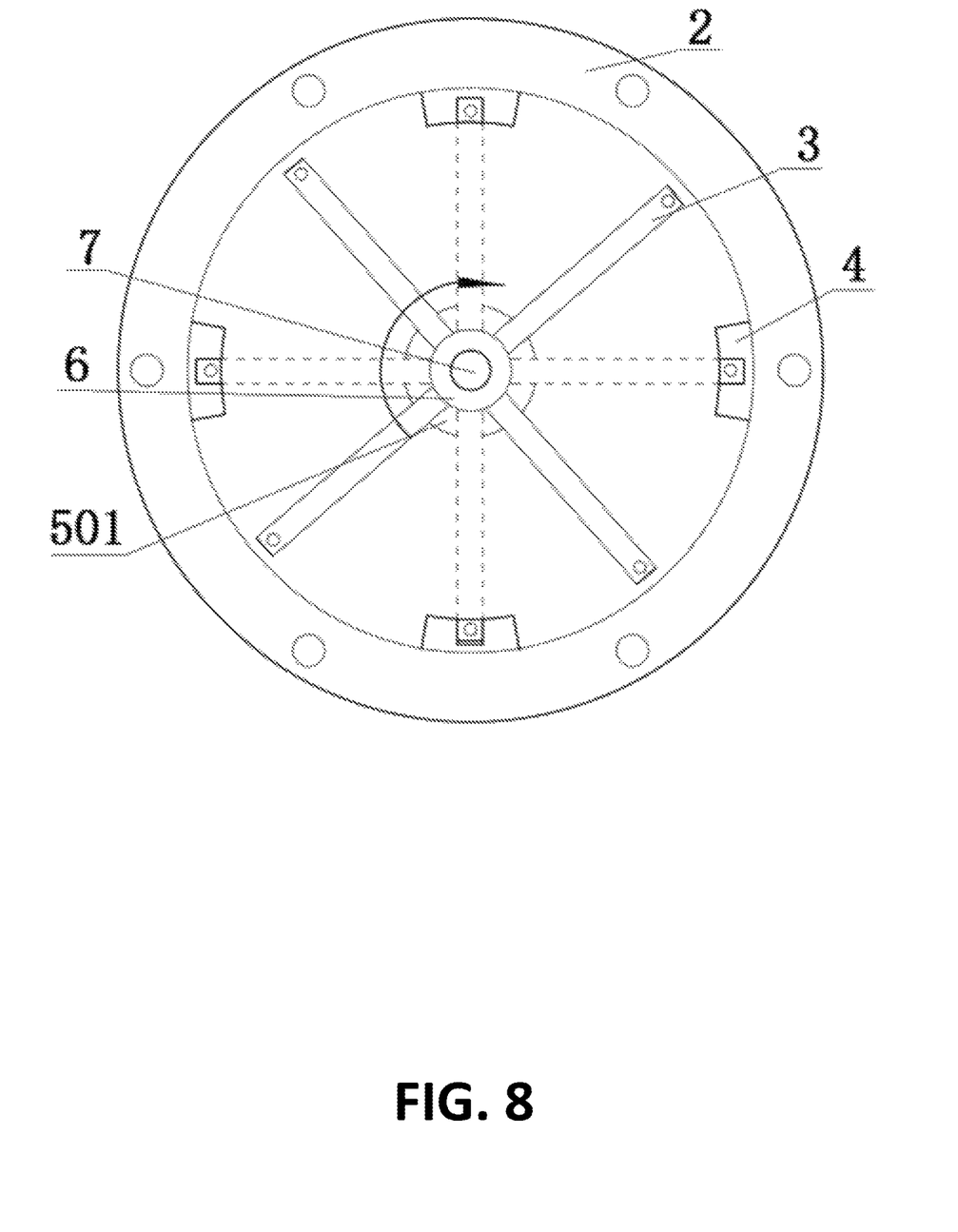
FIG. 8 is a mounting schematic diagram of an internal structure of the filter.

Referring to FIGS. 1 to 8, where, FIG. 1 is a semi-sectional view of a filter with passive-rotation filter elements ("filter") along a central symmetry line; FIG. 2 is a partially enlarged view of position B in FIG. 1; FIG. 3 is a partially enlarged view of position C in FIG. 1; FIG. 4 is a schematic diagram of an internal mounting structure of a tank body of the present disclosure; FIG. 5 is a schematic structural diagram of a filter element; FIG. 6 is a schematic structural diagram of a filter loop 500; FIG. 7 is a partially enlarged schematic diagram of position A in FIG. 6; FIG. 8 is a mounting schematic diagram of an internal structure of the filter filter.

As shown in FIGS. 1, 4 and 8, the present embodiment provides a filter with passive-rotation filter elements ("filter") 100. The filter 100 includes a filter closure head 1, a tank body 2, an inlet of the filter 12 and an outlet of the filter 13, cross support frames 3 including an upper cross support frame 3U and a lower cross support frame 3L, groups of support rings including support ring 4, and filter elements including filter element 5. The filter closure head 1 can be fixedly mounted with the tank body 2 through flanges. As shown in FIGS. 2 and 3, the filter 100 can further include a mandrel 6, shaft head closure heads including shaft head closure head 7, sliding bearing support rings including sliding bearing support ring 8, sliding bearings including sliding bearing 9, snap rings including a snap ring 10, and sealing loops including sealing loop 11. As shown in FIGS. 5-7, the filter element 5 can include filter element sleeves including filter element sleeve 501, blades including blade 502, peripheral loops including peripheral loop 503, N-shaped supports including N-shaped support 504, and annular bodies including annular body 505, wherein the filter closure head 1 is fixedly mounted with the tank body 2 through flanges. Two groups of support rings including group of support rings 4 are respectively fixedly mounted at the upper end and the lower end in the tank body 2. Grooves used for matching and lapping the two cross support frames 3U and 3L are formed in both groups of the support rings including group of support rings 4. The two sliding bearings including sliding bearing 9 are respectively fixedly mounted on the sliding bearing support rings including sliding bearing support ring 8. The sliding bearing support rings including sliding bearing support ring 8 are respectively welded at the central positions of the cross support frames 3U and 3L. The two sliding bearings including sliding bearing 9 are separately rotatably mounted with the mandrel 6. Screw threads are turned in one end of the mandrel 6. A snap ring groove is formed in the shaft diameter at the bottom of the other end of the mandrel 6. A hexagonal plane is turned on the end surface of the bottom of the mandrel 6, so as to facilitate mounting. The snap ring 10 is mounted in the snap ring groove of the mandrel 6. The shaft head closure heads including the shaft head closure head 7 are fixed to the two ends of the mandrel 6 through the screw threads. The filter element sleeves 501 of the four filter elements, including the filter element sleeve 501 of the filter element 5, are respectively fixedly mounted on the mandrel 6. The blades of the four filter elements, including the blade 502 of the filter element 5, are respectively helically fixed and welded on the filter element sleeves including filter element sleeve 501. The filter element sleeve 501 is fixedly mounted with the center of the annular body 505 on the innermost side. The annular bodies including annular body 505 are welded together through the N-shaped supports including N-shape support 504, and the peripheral loop 503 is welded on the outermost side of the filter element 5.

To achieve a high-efficiency water treatment effect, the blades including blade 502, the peripheral rings including peripheral ring 503, the N-shaped supports including N-shaped support 504, and the annular bodies including annular body 505 can all be made of an anti-wax anti-scale anti-corrosion alloy material.

To improve the filter efficiency, filter element blades including blade 502 and structures are designed according to propeller blade hydrodynamics, so that the filter element may be rotated passively under the impact of a high-speed fluid and be in full contact with an ionization material, thereby preventing scaling.

To meet a mounting requirement, both groups of the support rings 4 are welded on the tank body 2 through four fan-shaped rings. A hexagonal joint is welded at an end part of each shaft head closure head, including shaft head closure head 7.

To ensure the service life, three sealing loops including sealing loop 11 are respectively mounted on the upper side and the lower side of the lower sliding bearing 9 and the lower side of the upper sliding bearing 9, and a sealing gasket is mounted between each shaft head closure head 7 and the upper cross support frame 3.

The overall appearance shape of the filter with passive-rotation filter elements is a straight through type filter, where, the structures, such as the internal filter elements including filter element 5, the cross support frames 3U and 3L, and the shaft head closure heads including the shaft head closure head 7, are placed in the tank body 2 for calibrating and mounting after being mounted preliminarily. When the structures, such as the internal filter elements including filter element 5, the cross support frames 3U and 3L, and the shaft head closure heads including the shaft head closure head 7, are placed in the tank body 2, they cannot be directly placed in the tank body 2 due to the limitation of the lengths of the cross support frames 3U and 3L and the inside diameter of a support rings including support ring 4, so the support rings including support ring 4 is designed into four split structures, and thus the cross support frames 3U and 3L and the support rings including support ring 4 may be placed in the tank body 2 in a staggered manner. Then, the cross support frames 3U and 3L are made directly face the grooves in the support rings including support ring 4 (as shown in FIG. 8), and the upper and lower cross support frames 3U and 3L are screwed in the grooves of the support rings including support ring 4 by tightening the shaft head closure heads including the shaft head closure head 7, so the mounting of the internal structure of the filter is realized. The mandrel 6 is rotatably mounted on the two cross support frames 3U and 3L through the sliding bearings including sliding bearing 9, and is sealed through the shaft head closure heads including shaft head closure head 7 and the sealing loops including sealing loop 11, so that the service life of the sliding bearings including sliding bearing 9 is ensured. A liquid to be filtered enters from the filter closure head 1, and the filter elements including filter element 5 are rotated passively under the impact effect of the liquid to be filtered, so that the filter elements are in full contact with the liquid to be filtered, thereby improving the filter effect. The blades including blade 502, the peripheral loops including peripheral loop 503, the N-shaped supports including N-shape support 504, and the annular bodies including annular body 505 of the filter elements including filter element 5 can all be made of an anti-wax anti-scale anti-corrosion alloy material, so that the filtering effect may be effectively achieved.

Several examples are used for illustration of the principles and implementation manners of the specification. The description of the above embodiments is merely used to help understand the method and its core principles of the present disclosure. In addition, those skilled in the art may make various modifications in terms of specific implementation manners and scope of application in accordance with the teachings of the present disclosure. In conclusion, the content of the present description shall not be construed as a limitation to the present disclosure.

What is claimed is:

1. A filter with passive-rotation filter elements, comprising a filter closure head, a tank body, two cross support frames, a mandrel, and filter elements, wherein the filter closure head is provided with a liquid inlet and is fixedly mounted with the tank body through flanges; a liquid outlet is formed in the tank body; two groups of support rings are respectively fixedly mounted at an upper end and a lower end in the tank body; grooves used for matching and lapping the two cross support frames are formed in both groups of the support rings; sliding bearings used for rotatably mounting the upper end and the lower end of the mandrel are arranged at central positions of the two cross support frames; filter element sleeves of the filter elements are fixedly mounted on the mandrel; the filter elements comprise blades and a filter loop; the blades are welded on the filter element sleeves; centers of the filter loops located below the blades are mounted and fixed to the filter element sleeves; a liquid to be filtered enters from the filter closure heads; and the filter elements are to be rotated passively under an impact effect of the liquid to be filtered, so that the filter elements are in full contact with the liquid to be filtered, so that a filtering effect is achieved.

2. The filter with passive-rotation filter elements according to claim 1, wherein sliding bearing support rings are welded at the central positions of the two cross support frames; and the sliding bearings are respectively fixedly mounted on the sliding bearing support rings.

3. The filter with passive-rotation filter elements according to claim 1, wherein screw threads are turned in a top end of the mandrel; a snap ring groove is formed in a shaft diameter at a bottom of the mandrel; a hexagonal plane is turned on an end surface of the bottom of the mandrel, so as to facilitate mounting;

a snap ring is mounted in the snap ring groove; and two ends of the mandrel are fixedly mounted with shaft head closure heads through screw threads after penetrating through the sliding bearings.

4. The filter with passive-rotation filter elements according to claim 3, wherein both groups of the support rings are welded on the tank body through four fan- shaped rings; and a hexagonal joint is welded at an end part of each shaft head closure head.

5. The filter with passive-rotation filter elements according to claim 3, wherein sealing loops are respectively arranged on a lower side of an upper sliding bearing and an upper side and a lower side of a lower sliding bearing; and a sealing gasket is mounted between each shaft head closure head and the upper cross support.

6. The filter with passive-rotation filter elements according to claim 1, wherein there are four filter elements; the filter element sleeves of the four filter elements are fixedly mounted on the mandrel in sequence from top to bottom; and the blades are respectively helically fixed and welded on the filter element sleeves.

7. The filter with passive-rotation filter elements according to claim 1, wherein the filter loop comprises a plurality of loops of concentric annular bodies with different diameters and a peripheral loop; the plurality of loops of concentric annular bodies are welded together through an N-shaped support; the peripheral loop is welded on an outermost loop of the concentric annular bodies; and a center of an annular body on an innermost side is matched and fixedly mounted with the filter element sleeve sleeves.

8. The filter with passive-rotation filter elements according to claim 7, wherein the blades, the peripheral loop, the N-shaped support, and the concentric annular bodies are all made of an anti-wax anti-scale anti-corrosion alloy material.

\* \* \* \* \*

UNITED STATES PATENT AND TRADEMARK OFFICE
CERTIFICATE OF CORRECTION

| | | |
|---|---|---|
| PATENT NO. | : 11,845,023 B2 | Page 1 of 1 |
| APPLICATION NO. | : 17/290714 | |
| DATED | : December 19, 2023 | |
| INVENTOR(S) | : Miaoyan Cao, Shaojie Tian and Han Hu | |

It is certified that error appears in the above-identified patent and that said Letters Patent is hereby corrected as shown below:

On the Title Page

In the Title, and in the Specification, Column 1, Line 2, replace "FLEMENTS" with
-- ELEMENTS --.

Signed and Sealed this
Twenty-sixth Day of December, 2023

Katherine Kelly Vidal
*Director of the United States Patent and Trademark Office*